(12) United States Patent
Havlir et al.

(10) Patent No.: US 9,183,611 B2
(45) Date of Patent: Nov. 10, 2015

(54) APPARATUS IMPLEMENTING INSTRUCTIONS THAT IMPOSE PIPELINE INTERDEPENDENCIES

(71) Applicant: Apple Inc., Cupertino, CA (US)

(72) Inventors: Andrew M. Havlir, Austin, TX (US);
Terence M. Potter, Austin, TX (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 13/935,299

(22) Filed: Jul. 3, 2013

(65) Prior Publication Data

US 2015/0009223 A1    Jan. 8, 2015

(51) Int. Cl.
*G06F 9/38* (2006.01)
*G06T 1/20* (2006.01)

(52) U.S. Cl.
CPC ............... *G06T 1/20* (2013.01); *G06F 9/3838* (2013.01); *G06F 9/3851* (2013.01); *G06F 9/3867* (2013.01); *G06F 9/3885* (2013.01)

(58) Field of Classification Search
CPC ... G06F 9/3838; G06F 9/3851; G06F 9/3867; G06F 9/3885
USPC .................................. 345/506, 557, 559, 561
See application file for complete search history.

(56) References Cited

U.S. PATENT DOCUMENTS

| | | | |
|---|---|---|---|
| 5,787,026 A * | 7/1998 | Orenstein et al. | 708/521 |
| 5,838,988 A * | 11/1998 | Panwar et al. | 712/32 |
| 6,788,303 B2 | 9/2004 | Baldwin | |
| 6,870,540 B1 | 3/2005 | Lindholm et al. | |
| 6,882,346 B1 * | 4/2005 | Lefebvre et al. | 345/506 |
| 6,919,896 B2 * | 7/2005 | Sasaki et al. | 345/505 |
| 7,466,318 B1 * | 12/2008 | Kilgard | 345/582 |
| 7,928,990 B2 | 4/2011 | Jiao et al. | |
| 7,990,390 B2 * | 8/2011 | Law et al. | 345/506 |
| 8,305,381 B2 | 11/2012 | Boyd et al. | |
| 2005/0122330 A1 * | 6/2005 | Boyd et al. | 345/501 |
| 2006/0253519 A1 * | 11/2006 | Tran | 708/523 |
| 2007/0130447 A1 * | 6/2007 | Coon et al. | 712/215 |

\* cited by examiner

*Primary Examiner* — Joni Richer
(74) *Attorney, Agent, or Firm* — Meyertons, Hood, Kivlin, Kowert & Goetzel, P.C.

(57) ABSTRACT

Techniques are disclosed relating to implementation of gradient-type graphics instructions. In one embodiment, an apparatus includes first and second execution pipelines and a register file. In this embodiment, the register file is coupled to the first and second execution pipelines and configured to store operands for the first and second execution pipelines. In this embodiment, the apparatus is configured to determine that a graphics instruction imposes a dependency between the first and second pipeline. In response to this determination, the apparatus is configured to read a plurality of operands from the register file including an operand assigned to the second execution pipeline and to select the operand assigned to the second execution pipeline as an input operand for the first execution pipeline. The apparatus may be configured such that operands assigned to the second execution pipeline are accessible by the first execution pipeline only via the register file and not from other locations.

20 Claims, 8 Drawing Sheets

FIG. 1A

FIG. 1B dfdx results 240

| A[1] - A[0] | A[1] - A[0] |
|---|---|
| A[3] - A[2] | A[3] - A[2] | dfdy results 250

| A[2] - A[0] | A[3] - A[1] |
|---|---|
| A[2] - A[0] | A[3] - A[1] | dfdx pipeline interdependencies 220 dfdy pipeline interdependencies 230

Instance indices 210

| 0 | 1 |
|---|---|
| 2 | 3 |

FIG. 6

APPARATUS IMPLEMENTING INSTRUCTIONS THAT IMPOSE PIPELINE INTERDEPENDENCIES

BACKGROUND

1. Technical Field

This disclosure relates generally to graphics processing, and more specifically to implementation of gradient-type instructions.

2. Description of the Related Art

Graphics processing units (GPUs) within computer systems typically include multiple execution pipelines (often referred to as "execution instances") that operate on data in parallel. Typically, execution instances operate on fragments or pixels of an image independently. For example, each execution instance uses data for a given pixel and does not use data from other pixels being adjusted by other instances. However, gradient instructions use data from other execution instances to compute rates of change for fragment shader variables. For example, execution instances are often grouped to receive 2×2 blocks of pixels and controlled as a group. To execute gradient instructions, each execution instance may need an operand from another execution instance in the 2×2 group. Thus, each execution instance may receive operands from itself and another execution instance (e.g., a horizontal or vertical neighbor in the 2×2 group) for gradient-type operations. The OPENGL® dfdx and dfdy instructions are examples of gradient-type instructions. Operands may be available from multiple locations such as: a register file, storage elements within each execution instance, as a forwarded result at an output of an execution unit, etc. Routing operands from these different locations among groups of execution instances in order to provide operands for gradient instructions may consume considerable power and routing resources. GPUs are often used in mobile devices where battery power is limited and power consumption may be an important design consideration.

SUMMARY

Techniques are disclosed relating to implementation of gradient-type graphics instructions. In one embodiment, an apparatus is configured to source operands for gradient-type instructions from a register file and select operands for execution instances at the output of the register file before routing operands to appropriate execution instances. In one embodiment execution instances or pipelines are arranged in 2×2 groups of four instances, and gradient-type instructions may impose pipeline interdependencies between adjacent execution pipelines. The apparatus may be configured such that operands assigned to the second execution pipeline are accessible by the first execution pipeline only via the register file. This may reduce power consumption in routing operands for graphics instructions.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
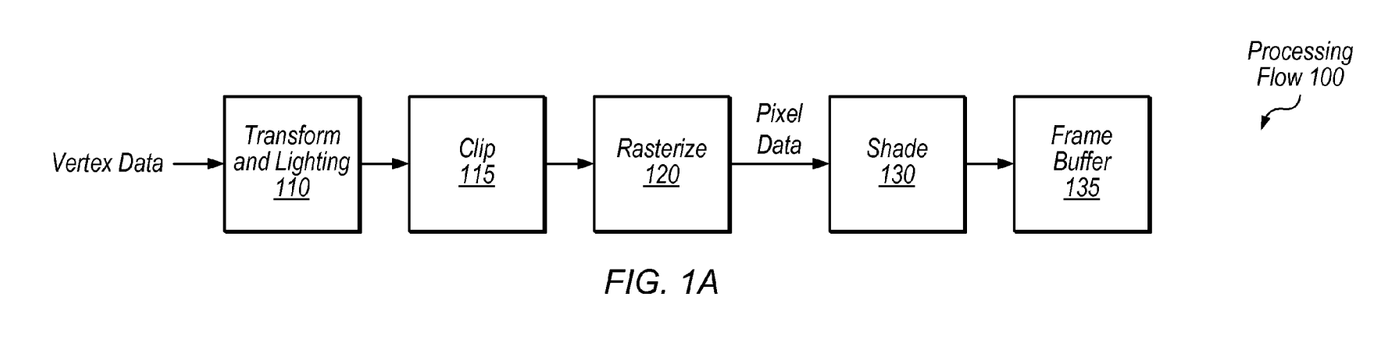
FIG. 1A is a block diagram illustrating a simplified graphics processing flow.
Figure 1B:
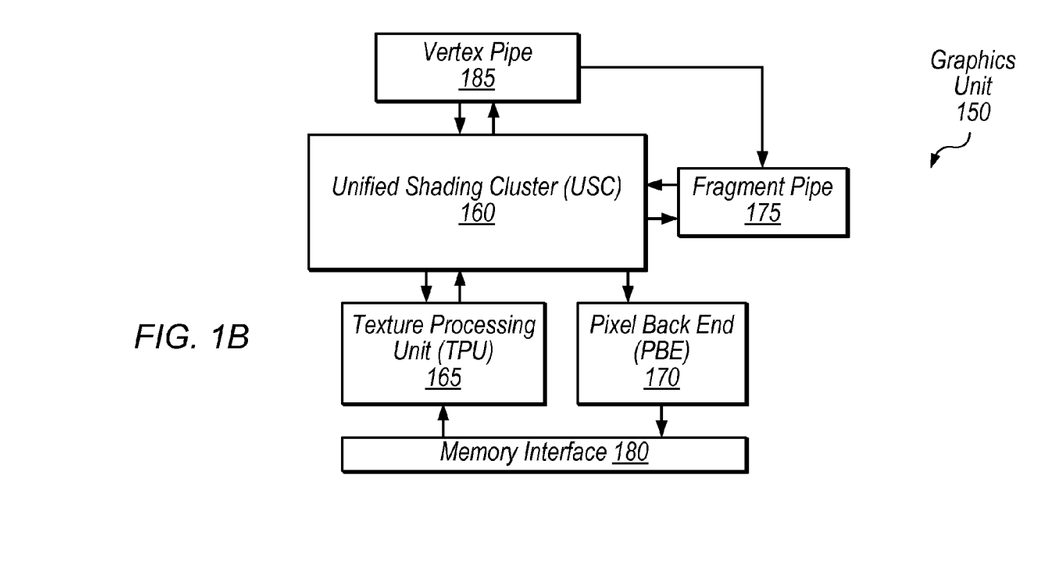
FIG. 1B is a block diagram illustrating one embodiment of a graphics unit.

This disclosure initially describes, with reference to FIGS. 1A-B, an overview of a graphics processing flow and an exemplary graphics unit. It then describes exemplary gradient-type operations with reference to FIG. 2. Further embodiments of a graphics unit configured to implement gradient-type instructions are described in further detail with reference to FIGS. 3-5 and an exemplary device is described with reference to FIG. 6. In some embodiments, a graphics unit as described herein may reduce power consumption associated with routing operands for gradient-type operations and improve routability by reducing routing pathways.

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area (e.g., at the edges of an image or for polygons that would fall behind other objects and do not need to be rendered). Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted, and additional processing steps may be implemented.

Referring now to FIG. 1B, a simplified block diagram illustrating one embodiment of a graphics unit 150 is shown. In the illustrated embodiment, graphics unit 150 includes unified shading cluster (USC) 160, vertex pipe 185, fragment pipe 175, texture processing unit (TPU) 165, pixel back end (PBE) 170, and memory interface 180. In one embodiment, graphics unit 150 may be configured to process both vertex and fragment data using USC 160, which may be configured to process graphics data parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution instances for processing data in parallel. USC 160 may be referred to as "unified" in the illustrated embodiment in the sense that it is configured to process both vertex and fragment data. In other embodiments, programmable shaders may be configured to process only vertex data or only fragment data.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Figure 2:
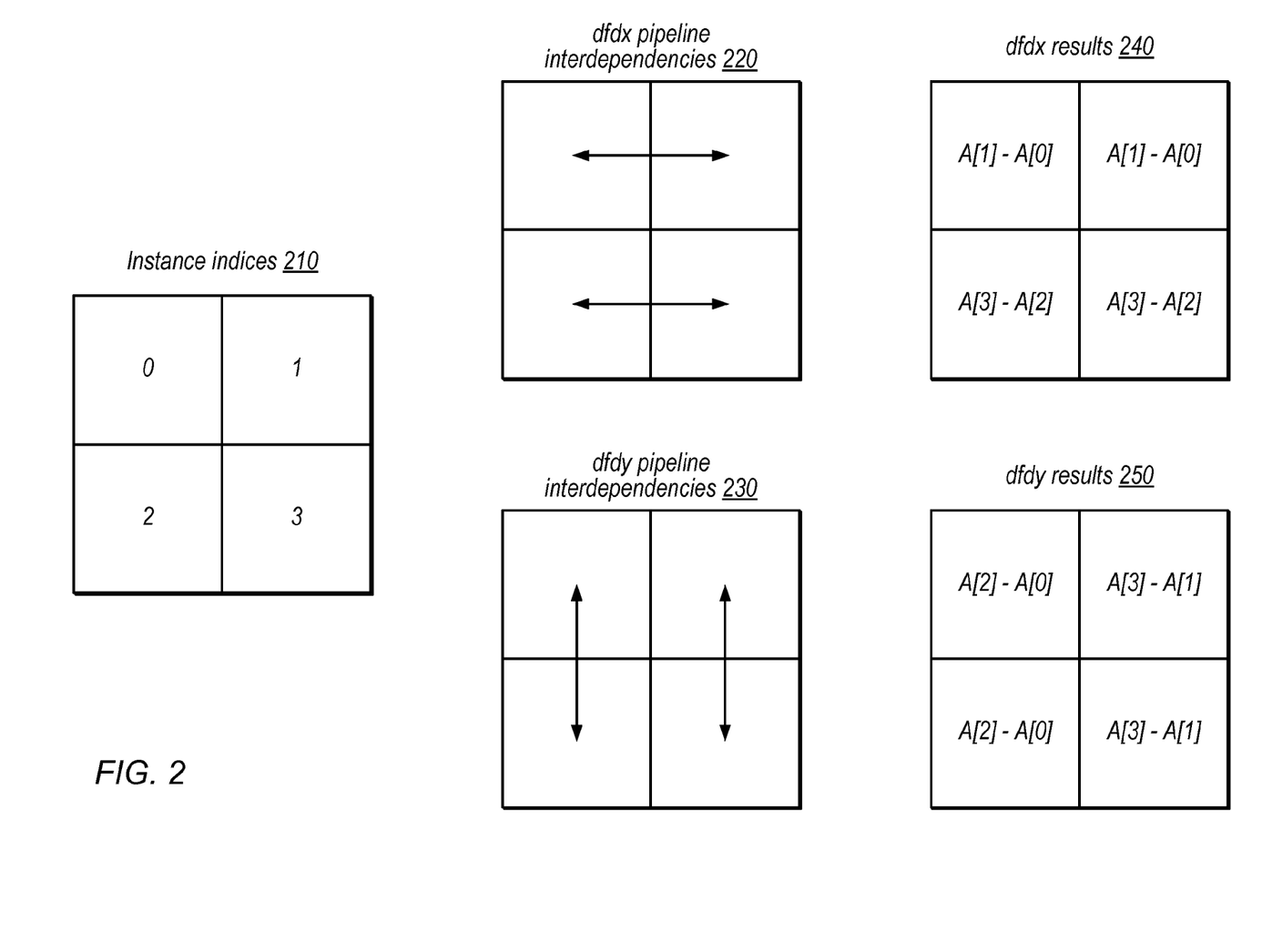
FIG. 2 is a diagram illustrating operations indicated by exemplary gradient-type instructions.

Referring now to FIG. 2, diagrams illustrating operations indicated by gradient-type instructions dfdx and dfdy are shown. FIG. 2 includes instance indices 210, which label instances in a group of four instances, dfdx pipeline interdependencies 220 and dfdy pipeline interdependencies 230 to show dependencies imposed by those instructions, and dfdx results 240 and dfdy results 250 to show operations indicated by those instructions.

Various techniques for handling instructions that impose pipeline interdependencies between execution pipelines are disclosed herein. Instructions that impose dependencies between pipelines cannot be executed independently using only operands assigned to or associated with a given pipeline, but require operands from other pipelines. "Gradient" instructions, also referred to as "gradient-type" instructions, are graphics instructions that impose dependencies between two or more execution pipelines processing pixel data. Gradient dependencies are typically imposed based on spatial relationships between pixels being processed by different pipelines. Examples of gradient-type instructions include dfdx and dfdy from the OPENGL® ISA and ddx and ddy from the DIRECT3D® ISA. Dfdx and dfdy are discussed herein in detail for exemplary purposes. Typically, non-gradient-type graphics instructions allow processing of fragments in different execution instances of USC 160 to proceed independently of other execution instances. However, gradient-type instructions typically compute rates of change for fragment shader variables using data from vertical or horizontal neighbor instances. For example, different execution instances may process data for different pixels of a horizontal line of pixels, and a gradient-type instruction may require determining a rate of change across pixels of the horizontal line. Graphics unit 150 may implement any of various gradient-type operations that impose various dependencies between groups or pairs of execution instances. In other embodiments, other types of instructions may impose dependencies between execution pipelines, such instructions being executed by various types of pipelines that process arrays of data, for example.

USC 160, in one embodiment, is configured to send fragment data as a "fragment quad" to a 2×2 group of four execution instances. In FIG. 2, instance indices 210 define labels for four execution instances in such a group, with the upper left instance labeled 0, the upper right instance labeled 1, the lower left instance labeled 2 and the lower right instance labeled 3. Each instance may include an execution pipeline. Dfdx pipeline interdependencies 220 show that instances 0 and 1 depend on each other for data for the dfdx instruction, as do instances 2 and 3. Thus, dfdx is associated with a set of pairs of dependent instances, with instances 0 and 1 making up one pair and instances 2 and 3 making up another pair. Similarly, dfdy pipeline interdependences 230 show that instances 0 and 2 depend on each other for data for the dfdx instruction, as do instances 1 and 3. Thus, dfdy is associated with a different set of pairs of dependent instances than dfdx, with instances 0 and 2 making up one pair and instances 1 and 3 making up another pair. Other instances (not shown) may make up further dependent pairs.

Dfdx results 240 and dfdx results 250 show the mathematical operations to be performed for these instructions using operands from the appropriate instances. The notation A[i] indicates an operand assigned to or associated with instance i. In the illustrated embodiment, each instance in a dependent instance pair performs the same subtraction operation on the same operands (e.g., for dfdx, instances 0 and 1 perform A[1] minus A[0]).

In other embodiments, other groupings of execution instances may be implemented which may be configured to execute other types of gradient-type instructions. FIG. 2 illustrates non-limiting exemplary operations dfdx and dfdy for particular embodiments of gradient-type instructions.

In various embodiments, routing operands between different instances for gradient-type instructions may consume considerable power and require significant routing area. An energy-efficient implementation of gradient instructions may be desirable in order to reduce power consumption, especially in mobile graphics applications.

Figure 3A:
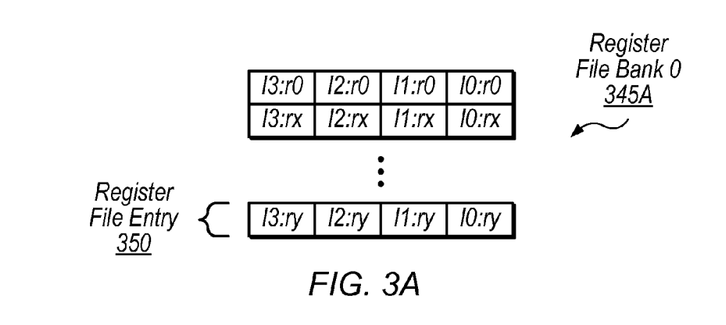
FIG. 3A is a block diagram illustrating one embodiment of a register file bank.

Referring now to FIG. 3A, a block diagram illustrating one embodiment of a register file bank 345A is shown. USC 160 may include one or more register files 345 configured to store data for execution pipelines. Register file 345 (described in further detail below with reference to FIG. 3B) may include multiple banks and each bank may store different registers, e.g., in order to enable access of multiple registers from different banks in a given cycle. In the illustrated embodiment, register file bank 345A includes multiple register file entries 350. In other embodiments, register file 345 may not include multiple banks.

In the illustrated embodiment, each entry 350 includes registers for multiple instances. For example, the "top" entry in FIG. 3A includes four r0 registers for instance 0 through instance 3. In some embodiments, each register file entry may be configured to store registers for 4N instances, where N is an integer. In one embodiment, for a given gradient instruction, USC 160 is configured to read a single register file entry to access data for a group of four execution instances. For example, USC may read register X for all four entries from a single register file entry 350.

Figure 3B:
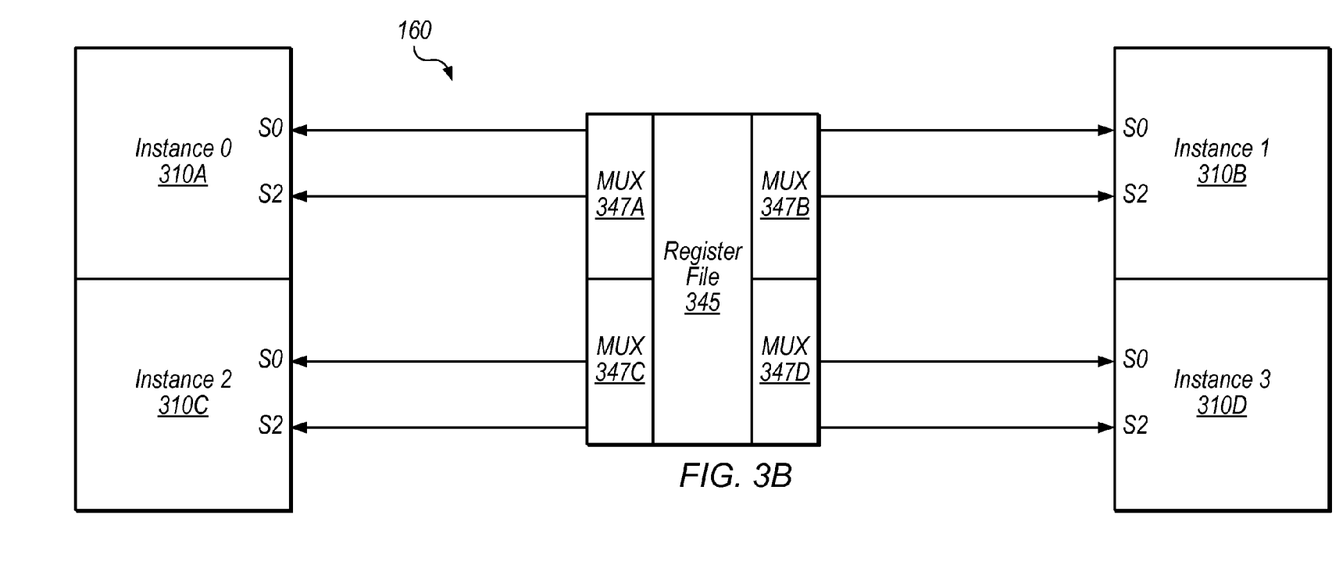
FIGS. 3B-3D are block diagrams illustrating embodiments of groups of execution pipelines in a graphics unit.

Referring now to FIG. 3B, a block diagram illustrating one embodiment of a portion of USC 160 is shown. In the illustrated embodiment, USC 160 includes register file 345 which provides operands to a group of four instances 310A-D via MUX's 347. In the illustrated 2×2 group of instances 310, instance 0 may be described as "adjacent" to instances 1 and 2, but not to instance 3. Similarly, instance 1 is adjacent to instances 0 and 3 but not to instance 2. In other embodiments, USC 160 may include additional groups of instances. In some embodiments, additional groups of four instances may each be coupled to similar MUXs 347 to those shown for the group in FIGS. 3B-C. Thus, USC 160 may be configured to execute a gradient instruction using any appropriate number of instances. Each instance 310 may include an arithmetic logic unit (ALU) or execution unit configured to perform mathematical operations on two or more input operands. In one embodiment, USC 160 may be configured to issue the same instruction to multiple instances at a time (i.e., rather than controlling instance execution individually) in order to perform the same operations on different data in parallel and to reduce power consumption involved in controlling instance execution. Similarly, in one embodiment, USC 160 may be configured to send the same control signals to multiple MUXs 347 at a time (i.e., rather than controlling MUXs separately) to reduce power consumption involved in operand routing.

Register file 345, in the illustrated embodiment, includes storage entries for registers of each instance. In the illustrated embodiment, the four instances 310A-D are grouped fairly near to each other and to register file 345, while MUXs 347 are located proximate register file 345 or included in register file 345. Register file 345 may receive data from various agents, for example, to be operated on by instances 310A-D and register file 345 may also store execution results from instances 310A-D. In one embodiment, register file 345 is configured to provide one or more operands in a given clock cycle for each instance 310. For example, for a multiply-subtract instruction that implements S0*S1−S2, register file 345 may be configured to provide sources S0, S1, and S2 to execution instances 310. In the illustrated embodiment, register file 345 is shown providing sources S0 and S2 for each instance. In one embodiment, register file 345 is also configured to provide a source S1 (not shown) for each instance. S1 may be directly routed to an S1 input of each instance 310 in the illustrated embodiment, in which S1 is not used for gradient instructions.

In one embodiment, instances 310A-D are each assigned registers in register file 345 as described above with reference to FIG. 3A. In one embodiment, for a given gradient instruction, instances 310 are each configured to perform the operation S0 minus S2. In one embodiment, register file 345 may include a register X for each instance, which may store different values of register X that are associated with different instances. In one embodiment, registers for multiple instances may be stored on a given bank of register file 345. In this embodiment, a read from a given bank of register file 345 may return operands for multiple instances. A gradient-type instruction may require an execution instance to obtain the operand in the given register from another execution instance in order to compute a gradient result. Describing an operand as "associated with" an execution pipeline refers to a situation in which the operand is generated by the execution pipeline or fetched for the execution pipeline and is stored in a storage element assigned to the pipeline. Further, describing an operand as "assigned to" an execution pipeline refers to a situation in which the operand is fetched or accessed for the execution pipeline or generated by the execution pipeline. In the illustrated embodiment, the label I0:S0 indicates source 0 from instance 0. As another example, the label I3:S2 indicates source 2 from instance 3. A given instruction may assign various different registers to S0 and S2.

In the illustrated embodiment, a given instruction includes at least information indicating gradient type and a source register. In this embodiment, the gradient type indicates one of (1) horizontal gradient, (2) vertical gradient, or (3) no gradient. The source register information may indicate which registers to provide for one or more of S0, S1, and S2 in embodiments where instances 310 are configured to accept up to three source operands. For example, the value in a given register X may be indicated as the operand to be provided for S0. Note that in some embodiments, an operand for register X may be provided from register file 345, operand caches in instances 310, and/or forwarded results from execution units of instances 310. In the illustrated embodiment, USC 160 is configured to require that sources for gradient instructions must be read from register file 345 and not from other storage elements or signals. This may reduce power consumption in various embodiments by avoiding routing of signals between execution instances, given that all signals come from the same physical location (register file 345). For example, in the illustrated embodiment, a single routing pathway is connected to each input source of instances 310, because selection is performed at the output of register file 345. This may significantly simplify routing compared to implementations in which multiple routing pathways are sent for each source and selection is performed at each instance.

Figure 3C:
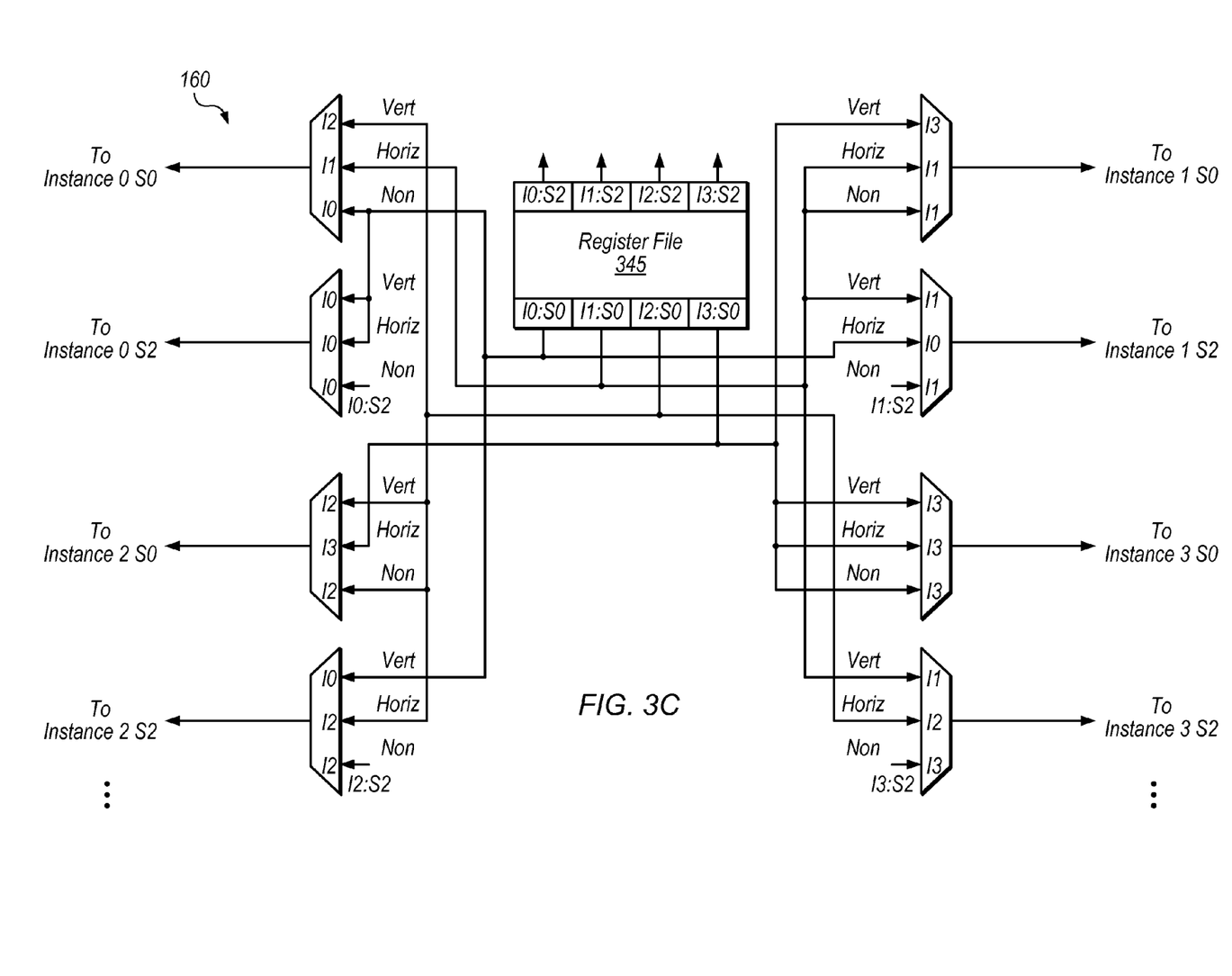

Referring now to FIG. 3C, a block diagram illustrating one embodiment of MUX 347 implementation is shown. In the illustrated embodiment, the MUXs are configured to pass their top input for vertical gradient instructions, their middle input for horizontal gradient instructions, and their bottom input for non-gradient instructions. In other embodiments, other MUX or selection configurations are contemplated; the assignment of signals for particular types of instructions to particular MUX inputs is exemplary only. In the illustrated embodiment, instance 0 input S0 receives I2:S0 for a vertical gradient instruction. Similarly, in the illustrated embodiment, instance 2 input S0 receives I3:S0 for a horizontal gradient instruction. As another example, instance 0 S2 receives I0:S2 for non-gradient instructions rather than an S0 operand from another instance. The MUXing of FIG. 3C is configured to implement the operations in tables 240 and 250 of FIG. 2 in embodiments where each instance 310 is configured to perform the operation S0 input minus S2 input.

In one embodiment, register file 345 is configured to output operands from only a single source (S0) from each instance for gradient instructions, and these outputs are routed to appropriate S0 and S2 inputs of instances 310A-N. In various embodiments, this may reduce power consumption in reading from register file 345 compared to reading multiple sources.

For a gradient-type instruction, each instance 310 may be configured to perform the mathematical operation S0 minus S2, in the illustrated embodiment. Defining this fixed operation for gradient-type instructions may reduce power consumption in controlling instance execution in various embodiments. In the illustrated embodiment, for a vertical gradient, USC 160 is configured to select an operand from instance 2 (I2) for input S0 of instance 0 310A and an operand from instance 0 (I0) for S2 of instance 0 310A. Based on this input, instance 0 is configured to perform the operation I2:S0 minus I0:S0 (corresponding to the upper left entry in table 250 of FIG. 2). In the illustrated embodiment, for non-gradient-type operations, each instance may be configured to execute independently of the others and may thus receive operands from only its own register file operands. In one embodiment, USC 160 is configured to provide the same control signals to each MUX of FIG. 3C, which may reduce power consumption involved in MUX control.

In other embodiments, various MUXing and/or routing techniques may be used at the output of register file 345 to provide appropriate sources to instances 310 for gradient-type instructions. For example, tri-state buffers or a dedicated select unit may be implemented. In one embodiment, in order to ensure that operands are sourced from register file 345 and not results or operand caches, an instruction set architecture implemented by USC 160 may require that gradient-type instruction operands are sourced from a register file. USC 160, in some embodiments, does not include routing pathways to route signals for gradient-type instructions from locations other than register file 345. In some embodiments, USC 160 does not include routing pathways to send operands between different execution pipelines at all. As used here, the term "routing pathway" refers to any coupling configured to transfer operand data from one location to another. The MUXs or a select unit may be physically located near the output of register file 345 in order to further reduce power consumption. Further, in other embodiments, various source numbers may be assigned to various operations. For example, the configuration in which instances 310 are configured to perform the operation S0–S2 is exemplary only, and any of various other configurations may be implemented.

Note that in the illustrated embodiment, USC 160 is configured to select two input operands for each of instances 310 from a group of all operands for the group of four instances 310 and send only the two selected input operands to each instance 310. This may reduce routing costs in various embodiments, e.g., compared to routing multiple operands and then MUXing at each instance. Speaking generally, for a given gradient-type instruction, USC 160 may require that all operands for the gradient-type instruction are read from register file 345 rather than other storage elements or signals, in some embodiments, and may not be configured to obtain operands for gradient-type instructions from other locations.

Reading all source operands from register file 345 and selecting/MUXing near the output of register file 345 may also reduce routing power costs in some embodiments. In some situations, reading operands only from a register file may slightly decrease performance (e.g., this may require waiting for operands to arrive at the register file instead of using forwarded results in an earlier cycle). However, in some embodiments, any performance decrease may be outweighed by reduction in power consumption associated with routing operands.

Some of the MUX's of FIG. 3C may be eliminated or optimized, but are shown in the illustrated example to facilitate explanation of selection logic. For example, the MUX feeding instance 3 input S0 may be eliminated because all three inputs, in the illustrated embodiment, provide the operand I3:S0. Similarly, some MUX's may be implemented as 2-input MUX's or other types of 2-input selection elements rather than 3-input MUX's as shown.

Figure 3D:
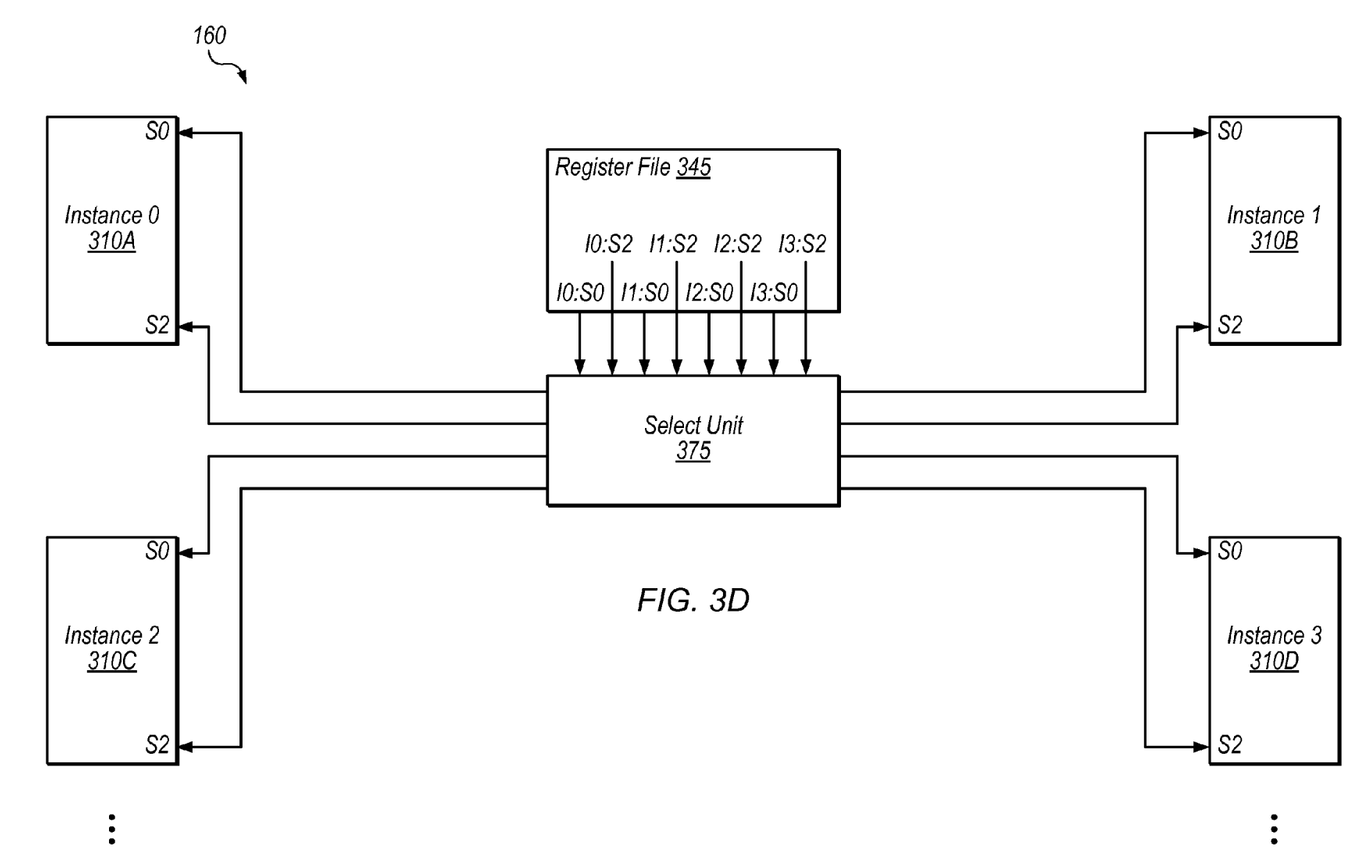

Referring now to FIG. 3D, a block diagram illustrating another embodiment of a portion of USC 160 is shown. In the illustrated embodiment, select unit 375 is configured to perform the selection implemented by the MUXs in FIG. 3C. Selection unit 375 may implement MUXs, tri-state buffers, etc. in order to implement this selection. In one embodiment, selection unit 375 is physically located near the output of register file 345. In another embodiment, selection unit 375 may be included in register file 345. In the illustrated embodiment, register file 345 is configured to output S0 operands for gradient-type instructions and route them to S0 and S2 inputs in instances 310. In the illustrated embodiment, select unit 375 is configured to select two operands for each instance 310 from the source operands read from register file 345 and send only those two operands to each instance 310. In the illustrated embodiment, USC 160 is not configured not source operands for gradient instructions from other storage elements or signals besides register file 345.

Figure 4:
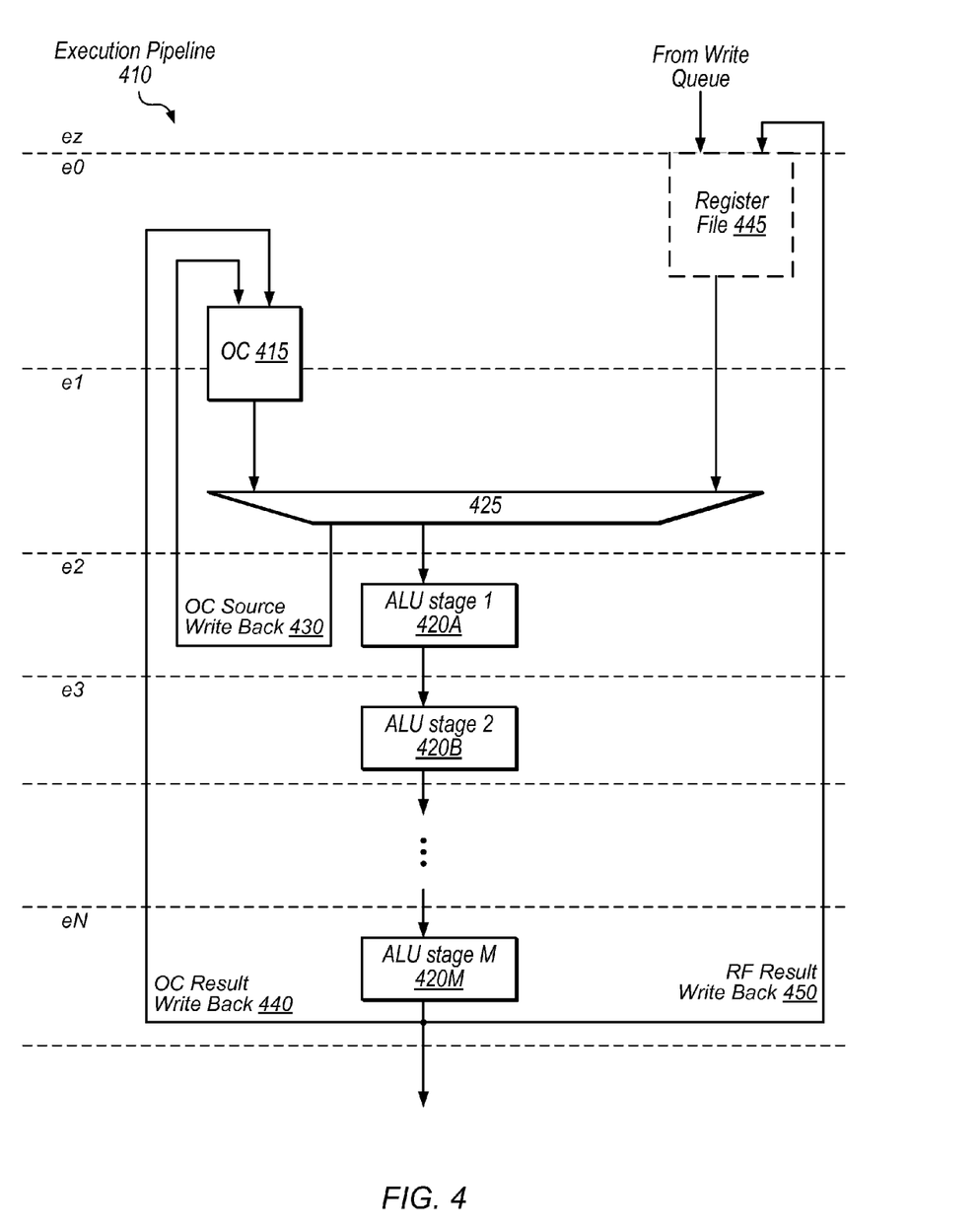
FIG. 4 is a block diagram illustrating an instance execution pipeline.

Referring now to FIG. 4, a block diagram illustrating one exemplary embodiment of an instance execution pipeline 410 is shown. In the illustrated embodiment, execution pipeline 410 includes operand cache 415, MUX 425, and a number of ALU stages 420A-M. Register file 445 is illustrated using dashed lines to indicate that may not be included in an execution pipeline. Register file 445 may store operands assigned to other instances in addition to the pipeline illustrated in FIG. 4.

At the end of the "e0" pipeline stage, in the illustrated embodiment, a write queue and/or ALU stage M 420M may write data into register file 445. Execution pipeline 410 may use this data as operands for subsequent instructions.

During the "e0" pipeline stage, in the illustrated embodiment, execution pipeline 130 may read one or more operands from register file 445 and may write one or more operands into operand cache 415. Storing operands in an operand cache may sometimes increase performance and/or reduce power consumption compared to reading operands from register file 445. In the illustrated embodiment, MUX 425 and/or ALU stage M 420M may provide operands to the operand cache in a given cycle (e.g., MUX 425 may provide be operands retrieved from register file 445 using OC source write back signal 430 and ALU stage M 420M may provide operands using OC result write back signal 440).

During the "e1" pipeline stage, in the illustrated embodiment, MUX 425 is configured to select and provide operands for an ALU from operand cache 415 and/or register file 445. MUX 425 may provide a number of operands to ALU stage 1, such as three operands, in one embodiment.

During the "e2" through "eN" pipeline stages, in the illustrated embodiment, an ALU may perform one or more operations using operands from MUX 425. The ALU may be a floating-point unit, an integer execution unit, a complex unit, etc. ALU stage M 420M may write its results back to operand cache 415 and/or register file 445.

In one embodiment, for gradient-type instructions, USC 160 is configured to source operands from register file 345 and not from other storage elements or signals. Thus, in this embodiment, USC 160 is configured not to source operands for gradient-type instruction from operand cache 415 or write back results 440 and 450.

Figure 5:
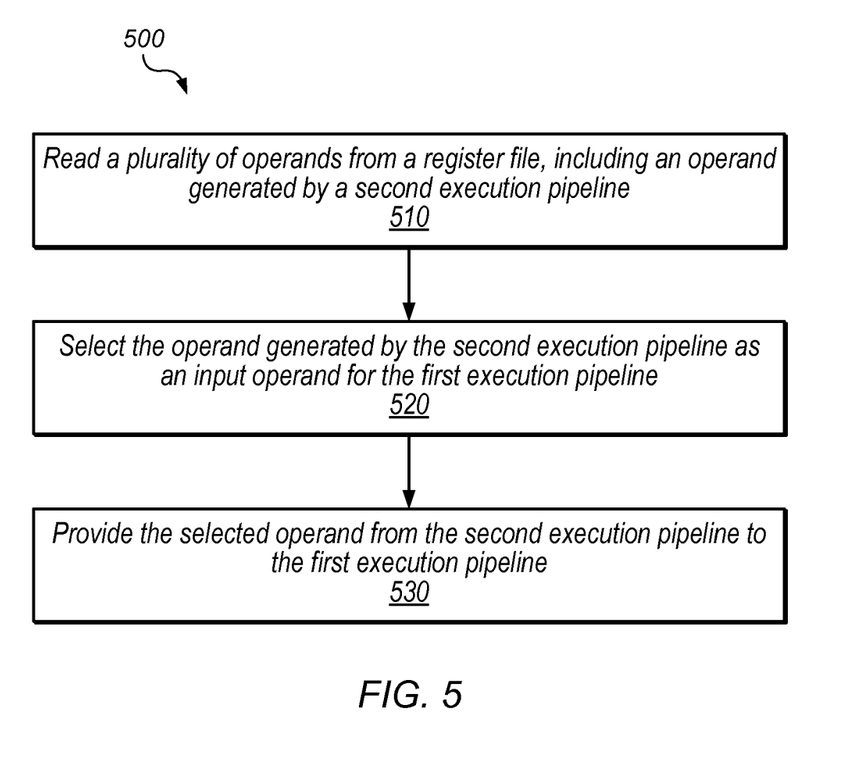
FIG. 5 is a flow diagram illustrating a method for providing operands for a gradient-type instruction.

Referring now to FIG. 5, a flow diagram illustrating one exemplary embodiment of a method 500 for providing operands for a gradient-type instruction is shown. The method shown in FIG. 5 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 510.

At block 510, a plurality of operands are read from a register file, including an operand generated by or written for a second execution pipeline. The second execution pipeline may be adjacent to a first execution pipeline in a 2×2 array of execution instances. In one embodiment, USC 160 may be configured to read all operands for a gradient instruction operands from the register file and not from other storage elements or signals. In one embodiment, USC 160 is configured to access operands from other locations for gradient instructions and store the operands in the register file before reading the operands from the register file and routing them to execution pipelines. The plurality of operands may each be read from the same source output of the register file for each instance involved in execution of the graphics instruction, in one embodiment. Flow proceeds to block 520.

At block 520, the operand generated by the second execution pipeline is selected as an input operand for the first execution pipeline. For example, an operand for instance 2 310C may be selected from instance 3 310D for a horizontal gradient instruction and vice versa. In one embodiment, the selection is performed at or near the output of the register file. In one embodiment USC 160 is configured to use the same selection signal to select operands for multiple pipelines rather than using per-pipeline selection control. Flow proceeds to block 530.

At block 530, the selected operand from the second execution pipeline is provided to the first execution pipeline. Providing selected operands in this manner may reduce power consumption involved in routing signals for gradient-type instructions in various embodiments. A select unit may provide the selected operand to an appropriate input of the first execution pipeline for execution of a gradient instruction. Flow ends at block 530.

Figure 6:
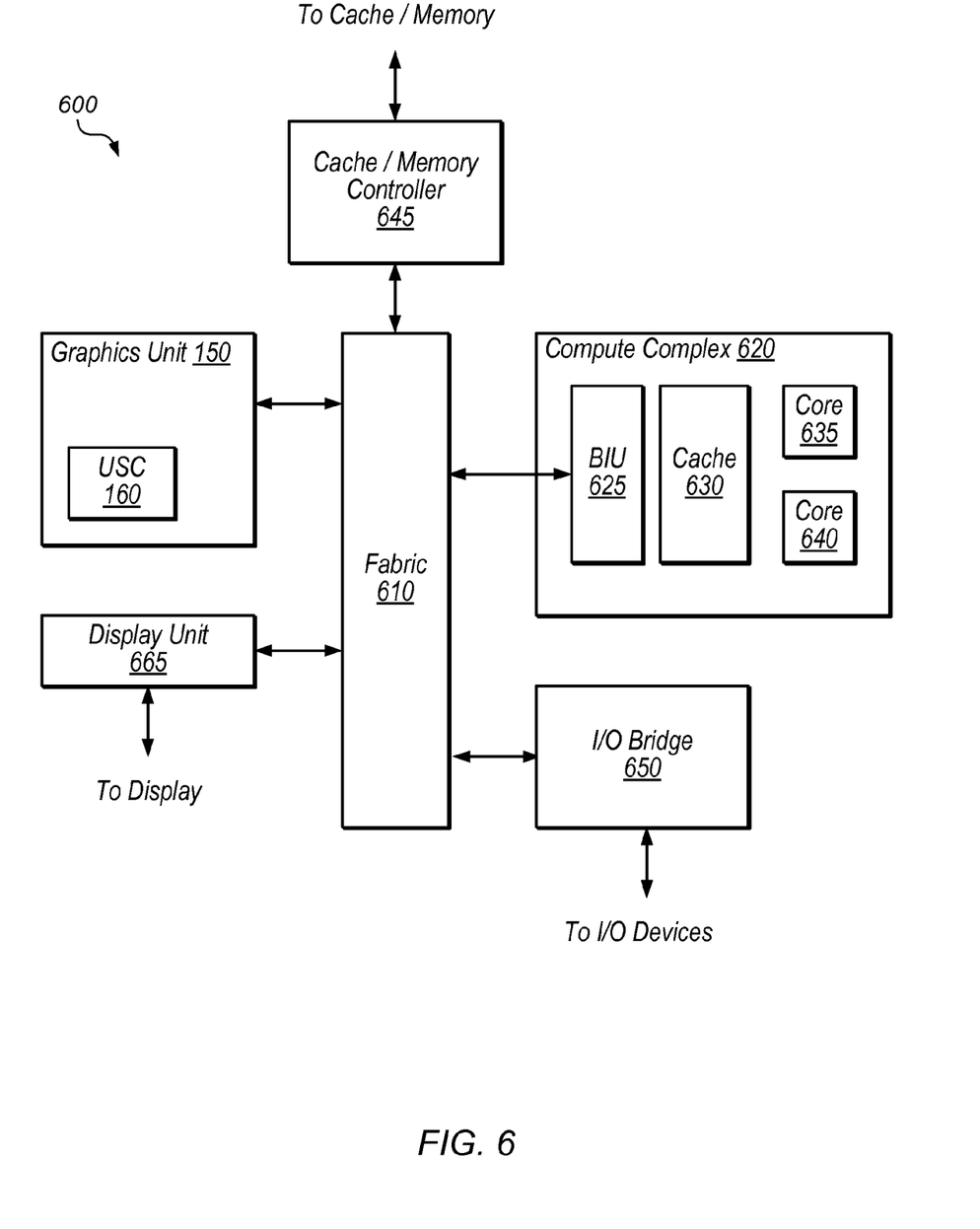
FIG. 6 is a block diagram illustrating a device that includes a graphics unit.

Referring now to FIG. 6, a block diagram illustrating an exemplary embodiment of a device 600 is shown. In some embodiments, elements of device 600 may be included within a system on a chip. In some embodiments, device 600 may be included in a mobile device, which may be battery-powered. Therefore, power consumption by device 600 may be an important design consideration. In the illustrated embodiment, device 600 includes fabric 610, compute complex 620, input/output (I/O) bridge 650, cache/memory controller 645, graphics unit 150, and display unit 665.

Fabric 610 may include various interconnects, buses, MUX's, controllers, etc., and may be configured to facilitate communication between various elements of device 600. In some embodiments, portions of fabric 610 may be configured to implement various different communication protocols. In other embodiments, fabric 610 may implement a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In various embodiments, compute complex 620 may include various numbers of cores and/or caches. For example, compute complex 620 may include 1, 2, or 4 processor cores, or any other suitable number. In one embodiment, cache 630 is a set associative L2 cache. In some embodiments, cores 635 and/or 640 may include internal instruction and/or data caches. In some embodiments, a coherency unit (not shown) in fabric 610, cache 630, or elsewhere in device 600 may be configured to maintain coherency between various caches of device 600. BIU 625 may be configured to manage communication between compute complex 620 and other elements of device 600. Processor cores such as cores 635 and 640 may be configured to execute instructions of a particular instruction set architecture (ISA) which may include operating system instructions and user application instructions.

Cache/memory controller 645 may be configured to manage transfer of data between fabric 610 and one or more caches and/or memories. For example, cache/memory controller 645 may be coupled to an L3 cache, which may in turn be coupled to a system memory. In other embodiments, cache/memory controller 645 may be directly coupled to a memory. In some embodiments, cache/memory controller 645 may include one or more internal caches.

As used herein, the term "coupled to" may indicate one or more connections between elements, and a coupling may include intervening elements. For example, in FIG. 6, graphics unit 150 may be described as "coupled to" a memory through fabric 610 and cache/memory controller 645. In contrast, in the illustrated embodiment of FIG. 6, graphics unit 150 is "directly coupled" to fabric 610 because there are no intervening elements.

Graphics unit 150 may be configured as described above with reference to FIGS. 1B, 3, and 4. Graphics unit 150 may include one or more processors and/or one or more graphics processing units (GPU's). Graphics unit 150 may receive graphics-oriented instructions, such OPENGL® or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 665 may be configured to read data from a frame buffer and provide a stream of pixel values for display. Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display).

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to device 600 via I/O bridge 650.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
    first and second execution pipelines configured to execute, in parallel, graphics instructions for respective first and second different portions of a frame of graphics data; and
    a register file coupled to the first and second execution pipelines and configured to store operands for the first and second execution pipelines;
    wherein the apparatus is configured, in response to determining that a graphics instruction imposes a dependency of the first pipeline on graphics data from the second portion of the frame that is assigned to the second execution pipeline, to:
        read a plurality of operands from the register file, including an operand assigned to the second execution pipeline; and
        select the operand assigned to the second execution pipeline as an input operand for the first execution pipeline; and
    wherein the apparatus is configured to execute instructions of a particular instruction set architecture (ISA), and wherein the particular ISA includes a restriction that operands for gradient-type instructions must be sourced from a register file.

2. The apparatus of claim 1, wherein the register file includes a plurality of entries, each configured to store operands for multiple pipelines, wherein the operand assigned to the second pipeline is stored in a portion of a register file entry assigned to the second execution pipeline.

3. The apparatus of claim 1, wherein the apparatus is configured such that operands assigned to the second execution pipeline are accessible by the first execution pipeline only via the register file.

4. The apparatus of claim 1, wherein the apparatus is further configured to:
    execute the graphics instruction using four or more execution pipelines;
    wherein the plurality of operands from the register file includes all operands for the graphics instruction for the four or more execution pipelines; and
    wherein the apparatus does not include routing pathways for operands between execution pipelines.

5. The apparatus of claim 4, wherein the graphics instruction is a gradient-type instruction, the apparatus further comprising:
    a select unit configured to:
        select two input operands for each of the four or more execution pipelines from the plurality of operands; and
        send, from the plurality of operands, only the selected two input operands to each of the four or more execution pipelines.

6. The apparatus of claim 5, wherein the select unit is further configured to send the selected two input operands to particular first and second inputs of each of the four or more execution pipelines, wherein each of the four or more execution pipelines is configured to subtract an operand provided to the first input from an operand provided to the second input for the graphics instruction.

7. The apparatus of claim 5, wherein the select unit is physically located proximate to the register file or in the register file.

8. The apparatus of claim 4, wherein the apparatus is configured to select operands for each execution pipeline of the four execution pipelines using a same set of control signals.

9. The apparatus of claim 1, wherein the apparatus is not configured to provide operands for the graphics instruction from storage elements or signals other than the register file.

10. The apparatus of claim 1,
    wherein the second execution pipeline is configured to forward results from an execution unit of the second execution pipeline for use as input operands;
    wherein the second execution pipeline includes an operand cache configured to store operands assigned to the second execution pipeline; and
    wherein the apparatus is configured to read the operand assigned to the second execution pipeline from the register file and not as a forwarded result or from the operand cache.

11. A method, comprising:
    in response to determining that a graphics gradient instruction imposes dependencies between first and second execution pipelines, reading a plurality of operands from a register file, including an operand assigned to the second execution pipeline;
    selecting the operand assigned to the second execution pipeline as an input operand for the first execution pipeline at an output of the register file; and
    providing the selected operand from the second execution pipeline to the first execution pipeline; and
    performing the gradient instruction in parallel using the first and second execution pipelines;
    wherein the graphics instruction is an instruction of a particular instruction set architecture (ISA), and wherein the particular ISA includes a restriction that operands for gradient-type instructions must be sourced from the register file and not from other storage elements or signals.

12. The method of claim 11, wherein the first and second execution pipelines are adjacent pipelines in a 2×2 group of four execution pipelines.

13. The method of claim 11, further comprising:
    executing the graphics instruction using four or more execution pipelines; and accessing all operands for the four or more execution pipelines for the graphics instruction from the register file and not from other locations.

14. The method of claim 13, further comprising:
assigning two or more operands from the all operands as input operands to each of the four or more execution pipelines before routing operands from the register file to the four or more execution pipelines.

15. The method of claim 11, wherein the graphics instruction is a dfdx instruction or a dfdy instruction.

16. The method of claim 11, wherein the graphics instruction indicates a subtraction between a first operand assigned to the first execution pipeline and a second operand assigned to the second execution pipeline.

17. An apparatus, comprising:
four hardware execution instances; and
a storage element configured to store operands for each of the four hardware execution instances;
wherein the apparatus is configured to read a plurality of operands assigned to the four hardware execution instances from the storage element in response to a gradient-type instruction and not to read operands from other locations in response to the gradient-type instruction;
wherein the apparatus is configured to select two operands indicated by the gradient-type instruction for each of the four hardware execution instances at an output of the storage element before routing the two operands to each of the four hardware execution instances; and
wherein the apparatus is configured to execute a first gradient-type instruction that imposes dependencies between a first set of pairs of the four hardware execution instances and is configured to execute a second gradient-type instruction that imposes dependencies between a second, different set of pairs of the four hardware execution instances.

18. The apparatus of claim 17, wherein the gradient-type instruction imposes dependencies between one or more pairs of the four hardware execution instances.

19. An apparatus, comprising:
first and second execution pipelines configured to execute, in parallel, graphics instructions for respective first and second different portions of a frame of graphics data; and
a register file coupled to the first and second execution pipelines and configured to store operands for the first and second execution pipelines;
wherein the apparatus is configured, in response to determining that a graphics instruction imposes a dependency of the first pipeline on graphics data from the second portion of the frame that is assigned to the second execution pipeline, to:
read a plurality of operands from the register file, including an operand assigned to the second execution pipeline; and
select the operand assigned to the second execution pipeline as an input operand for the first execution pipeline; and
wherein the apparatus is configured to select operands for each of the first and second execution pipelines using a same set of control signals.

20. An apparatus, comprising:
first and second execution pipelines configured to execute, in parallel, graphics instructions for respective first and second different portions of a frame of graphics data; and
a register file coupled to the first and second execution pipelines and configured to store operands for the first and second execution pipelines;
wherein the apparatus is configured, in response to determining that a graphics instruction imposes a dependency of the first pipeline on graphics data from the second portion of the frame that is assigned to the second execution pipeline, to:
read a plurality of operands from the register file, including an operand assigned to the second execution pipeline; and
select the operand assigned to the second execution pipeline as an input operand for the first execution pipeline; and
wherein the second execution pipeline is configured to forward results from an execution unit of the second execution pipeline for use as input operands;
wherein the second execution pipeline includes an operand cache configured to store operands assigned to the second execution pipeline; and
wherein the apparatus is configured to read the operand assigned to the second execution pipeline from the register file and not as a forwarded result or from the operand cache.

* * * * *